(12) United States Patent
Flemings et al.

(10) Patent No.: US 8,719,100 B1
(45) Date of Patent: May 6, 2014

(54) INTERACTIVE DELIVERY OF INFORMATION THROUGH IMAGES

(75) Inventors: Rey Flemings, San Francisco, CA (US); Michael Dungan, San Francisco, CA (US); Davin Potts, Austin, TX (US)

(73) Assignee: Stipple Inc., San Francisco, CA (US)

( * ) Notice: Subject to any disclaimer, the term of this patent is extended or adjusted under 35 U.S.C. 154(b) by 171 days.

(21) Appl. No.: 13/210,349

(22) Filed: Aug. 15, 2011

Related U.S. Application Data (60) Provisional application No. 61/481,689, filed on May 2, 2011.

(51) Int. Cl.
*G06Q 30/00* (2012.01)

(52) U.S. Cl.
USPC ............ 705/14.72; 705/14.69; 705/14.73

(58) Field of Classification Search
CPC .......... G06Q 30/0273; G06Q 30/0276; G06Q 30/0277
USPC ................. 705/14.69, 14.72, 14.73
See application file for complete search history.

(56) References Cited

U.S. PATENT DOCUMENTS

| | | | | |
|---|---|---|---|---|
| 5,855,008 | A * | 12/1998 | Goldhaber et al. | 705/14.1 |
| 6,307,573 | B1 | 10/2001 | Barros | |
| 7,346,561 | B1 * | 3/2008 | Devitt et al. | 705/26.61 |
| 7,596,549 | B1 | 9/2009 | Issa et al. | |
| 8,234,185 | B2 * | 7/2012 | Davis | 705/28 |
| 2004/0139391 | A1 | 7/2004 | Stumbo et al. | |
| 2006/0036585 | A1 | 2/2006 | King et al. | |
| 2007/0276928 | A1 | 11/2007 | Rhoads et al. | |
| 2007/0300142 | A1 | 12/2007 | King et al. | |
| 2008/0259184 | A1 | 10/2008 | Shingu et al. | |
| 2010/0158391 | A1 * | 6/2010 | Cunningham et al. | 382/209 |
| 2010/0175080 | A1 * | 7/2010 | Yuen et al. | 725/32 |
| 2010/0235259 | A1 * | 9/2010 | Farraro et al. | 705/27 |
| 2011/0299832 | A1 * | 12/2011 | Butcher | 386/248 |
| 2013/0024324 | A1 * | 1/2013 | Davis, Jr. | 705/26.35 |
| 2013/0024755 | A1 * | 1/2013 | Isaac | 715/201 |

OTHER PUBLICATIONS

PCT International Search Report and Written Opinion, PCT Application No. PCT/US10/32848, Jul. 2, 2010, 9 pages.
United States Office Action, U.S. Appl. No. 12/769,549, Nov. 10, 2011, 19 pages.

* cited by examiner

*Primary Examiner* — Raquel Alvarez
(74) *Attorney, Agent, or Firm* — Fenwick & West LLP (57) ABSTRACT

An image store including images from photo agencies is established by an image management system. Marketers interact with the image management system to review images in the image store and tag objects shown in the images. The object tags identify and provide information about the objects shown in the images. The marketers define campaigns having payment conditions indicating types of engagement with the images that trigger payments by the marketers. Publishers interact with the image management system to select images and publish the selected images to clients used by consumers. The publishers also provide the consumers with tag modules that execute on the clients to display the information about the objects shown in the published images. Consumer interactions with the displayed information are reported to the image management system, and the system accounts for payments by the marketers if the payment conditions are satisfied.

18 Claims, 4 Drawing Sheets

INTERACTIVE DELIVERY OF INFORMATION THROUGH IMAGES

CROSS-REFERENCE TO RELATED APPLICATIONS

This application claims the benefit of U.S. Provisional Application No. 61/481,689, filed May 2, 2011, which is incorporated by reference herein.

BACKGROUND

1. Field of Disclosure

This disclosure generally relates to the field of content publishing on the Internet, and specifically relates to image management and advertising on the Internet.

2. Description of the Related Art

The World Wide Web is widely used by consumers to view content related to topics of interest. Website publishers aggregate content including text, images and video in the hopes of attracting viewers to their websites. Photo agencies provide images to website publishers for use on the publishers' sites. The publishers typically pay to use these images.

The images used by publishers often contain objects of interest to a consumer. Sometimes these objects appear in images serendipitously, but often the objects are placed by marketers working on the behalf of the object retailers. The marketers have an interest in placing objects in images with celebrities and other such attractions, because such placements generate consumer interest and can boost sales and consumer engagement. For example, marketers working on behalf of a shoe manufacturer may pay a celebrity to wear a new shoe model, in the hopes that consumers will see the shoe worn by the celebrity and seek to purchase the same model.

A difficulty for marketers is that the consumers may not be able to identify objects shown in images. Images usually lack information about displayed objects, and website publishers have little, if any, incentive to provide such information in other content. Moreover, automated techniques relying on computer vision fail to properly identify objects in such images due, in part, to the nuance required to distinguish among similar-appearing objects. As a result, if the consumer is interested in, say, a pair of shoes shown in an image, the consumer might not know the brand, model or price of the shoes. Accordingly, the marketers' efforts are at least partially ineffective and the consumers are unable to purchase the objects in which they are interested.

SUMMARY

The above and other needs are met by a computer-implemented method, a computer system, and a non-transitory computer-readable storage medium storing executable code for interactive delivery of information through images.

One embodiment of the computer-implemented method comprises establishing an image store including a plurality of images, an image in the image store showing an object. The method further comprises receiving an object tag for the image, the object tag identifying and providing information about the object shown in the image. The method also comprises providing the image to a remote publisher, the publisher adapted to publish the image to a client, and providing information about the object shown in the image to the client responsive to the client receiving the published image from the publisher.

Embodiments of a computer system for interactive delivery of information through images comprise a non-transitory computer-readable storage medium storing executable computer program instructions for interactive delivery of information through images, a processor for executing the computer program instructions, the instructions executable to perform steps comprising establishing an image store including a plurality of images, an image in the image store showing an object. The steps further comprise receiving an object tag for the image, the object tag identifying and providing information about the object shown in the image. The steps also comprise providing the image to a remote publisher, the publisher adapted to publish the image to a client, and providing information about the object shown in the image to the client responsive to the client receiving the published image from the publisher.

Embodiments of the non-transitory computer-readable storage medium storing executable code for interactive delivery of information through images comprise code that when executed by a computer processor performs steps comprising establishing an image store including a plurality of images, an image in the image store showing an object. The steps further comprise receiving an object tag for the image, the object tag identifying and providing information about the object shown in the image. The steps also comprise providing the image to a remote publisher, the publisher adapted to publish the image to a client, and providing information about the object shown in the image to the client responsive to the client receiving the published image from the publisher.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
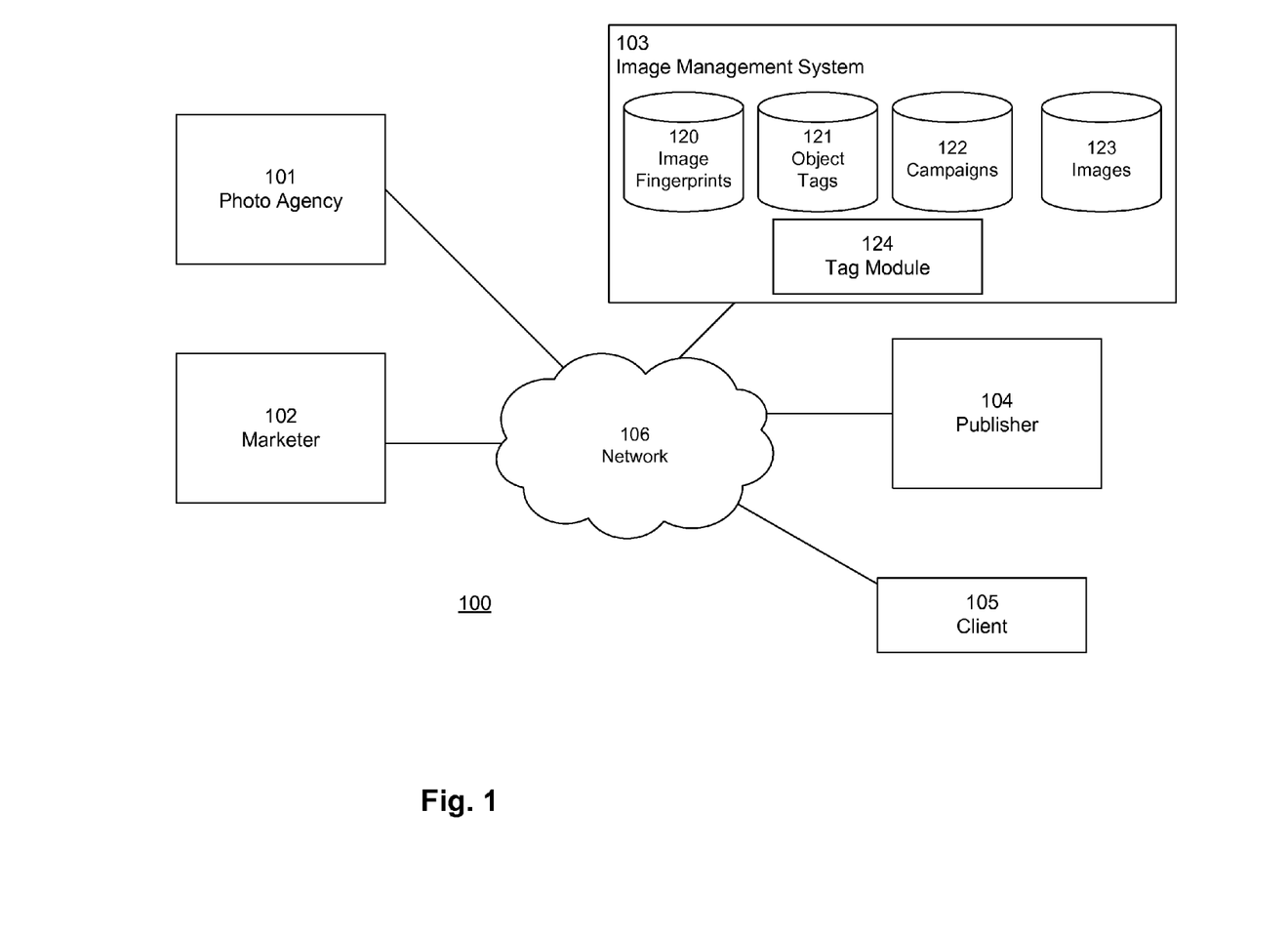
FIG. 1 is a high-level block diagram of an image management system operating in a networked environment, according to one embodiment of the present disclosure.

FIG. 1 is a high-level block diagram of an image management system 103 operating in a networked environment 100, according to one embodiment of the present disclosure. A photo agency system 101, marketer system 102, image management system 103, publisher system 104, and client 105 communicate via a network 106. In one embodiment, the systems 101, 102, 103, 104 and client 105 are remote and independent of each other. As shown the networked environment 100 includes only one of each entity in order to simplify and clarify the present description. However, there are many instances of such entities in some embodiments.

The network 106 is the Internet or another system of interconnected computer networks that use standard communications technologies and/or protocols to facilitate data transmission. Thus, the network 106 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML) and the extensible markup language (XML). In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The photo agency system 101 is used by a photo agency to submit photos or other types of images to the image management system 103. The images may be, for example, in a web-ready image file format (e.g. the portable network graphics (PNG), joint photographic expert group (JPEG), graphics interchange format (GIF), and tagged image file format (TIFF)), or they may be in an unprocessed raw format. The photo agency system 101 may be used by a single photographer submitting his or her own images, or the photo agency system may be used by an organization which submits the images from numerous photographers or other sources. The photo agency system 101 provides not only images to the image management system 103, but also metadata describing the image content. The metadata include information such as the dates/times that the images were captured, the events shown in the images, identities of celebrities or other people contained in the images, etc. However, the metadata does not necessarily identify certain objects shown in the images, such as clothing worn by celebrities shown in the images.

The marketer system 102 is used by a marketer to promote a particular product object such as a product or service. The marketer may arrange for objects to be photographed with celebrities or other attractions of interest to consumers. For example, the marketer may clothe a celebrity at an event where it is known that photographers from photo agencies will take pictures of the celebrity. Thus, the marketer has accurate knowledge of the objects shown in the images, and can correctly identify the objects.

The marketer 102 interacts with the image management system 103 to create object tags and marketing campaigns (called simply "campaigns") for the objects being promoted. To this end, the marketer interacts with the image management system 103 to "tag" objects shown in the images provided by the photo agency 101. An object tag identifies an object in an image, specifies the location of the object within the image, and indicates one or more actions to be performed when a consumer interacts with the tagged image or otherwise activates the tag. For example, if the image shows a celebrity wearing a pair of shoes, the marketer 102 can "tag" the shoes by providing information about the brand and model of the shoes, identifying the location of the shoes in the image, and specifying an action such as displaying a pop-up message showing the information if a consumer activates the tag.

The marketer establishes a campaign that specifies one or more objects and payment conditions indicating the amount of money that the marketer is willing to pay for consumer engagement with those objects. For example, the campaign may specify that a subset of the objects tagged by the marketer are included within the campaign. The campaign may also specify a maximum amount of funds that the marketer is willing to spend on the campaign, and the amount that the marketer will pay for each consumer engagement. A consumer engagement generally corresponds to a consumer activating an action specified in a tag for an object in the campaign.

The publisher system 104 is used by a publisher to create and publish content on the network 106. In one embodiment, the publisher publishes one or more websites that include content such as images, text, and video. The publisher may be independent of the image management system and hence the content published by the publisher need not derive from the image management system, except that the content may include one or more images provided by the image management system. The publisher interacts with the image management system 103 to select images provided by the photo agencies for use with the publishers' publications. The publisher 104 may select images based on the subject matter included in the images, as indicated by the image metadata. The publisher 104 may also select images based on the campaigns for objects in object tags associated with the images. In order to use the selected images, the publisher 104 may share the payment with the photo agency. The publisher system 104 publishes the selected images to clients 105 via one or more websites.

The client 105 is an electronic device used by a human consumer to view content published by publisher system 104. The client 105 may be, for example, a desktop, laptop, or tablet computer, a mobile telephone, a set-top box, a dedicated electronic reader, or other form of electronic device, and includes a web browser for viewing content received from the network 106. The consumer uses the client 105 to interact with the tagged images published by the publisher. For example, the consumer can view an image showing a tagged pair of shoes and use the client 105 to activate the tag for the shoes. By activating the tag, the consumer can view information about the shoes, purchase the shoes, or perform other such actions.

The image management system 103 facilitates delivery of the marketer's information by allowing consumers using clients 105 to interact with the tags placed by marketers in images from photo agencies. In one embodiment, the image management system 103 stores images 123 provided by photo agencies, as well as object tags 121 and campaigns 122 defined by marketers. In addition, the image management system 103 generates and stores image fingerprints 120 that serve to uniquely identify the images 123. The image management system 103 provides user interfaces (UIs) allowing marketers to view and tag images, and to define the marketing campaigns. In addition, the image management system 103 provides UIs allowing publishers to view images 123 having tagged products and the terms of the campaigns associated with the images, and to select images for use by the publishers. In one embodiment, the image management system provides these UIs as web-based UIs using a web server.

The image management system 103 also provides publishers with a tag module 124 that publishers can in turn provide to clients 105 to activate the tags in served images. In one embodiment, the publishers serve the tag module 124 to clients 105 along with the publishers' content. The tag module 124 executes within the web browsers of a client 105, fingerprints the images served to the client by the publisher, and interacts with the image management system 103 to identify images 123 having associated object tags 121 and campaigns 122. The image management system 103 provides the information associated with the tagged images to the tag module 124 executing at the client.

The tag module 124 provides functionality at the client 105 allowing the consumer to interact with the tags. For example, the tag module 124 may cause the client's browser to display visual markers at locations of tagged products within an image. If the consumer interacts with a visual marker, the tag module 124 may cause additional interfaces to appear on the client 105 that allow the consumer to interact with information provided by the marketer through the object tags. For example, the interaction may trigger the appearance of a pop-up window containing information about a product, or may bring up an interface that allows the consumer using the client 105 to provide information to the marketer.

When a consumer using the client 105 activates an object tag and engages with the information provided by the marketer, the image management system 103 tracks this activity via the tag module 124. The image management system 103 determines if the consumer's activity satisfies the payment conditions of the campaign. For example, if the marketer 102 has defined a campaign that pays for click-through, then the image management system 103 will determine if the consumer has clicked on the link provided by the object tag. The image management system 103 accounts for, and collects, payments from marketers based on consumer interactions with tagged images. Depending upon the embodiment, the image management system 103 may share the revenue with the photo agencies and the publishers. Thus, the image management system 103 provides a way for marketers to provide information about objects shown in images from photo agencies to consumers, and rewards publishers for publishing the images.

Hardware Environment

Figure 2:
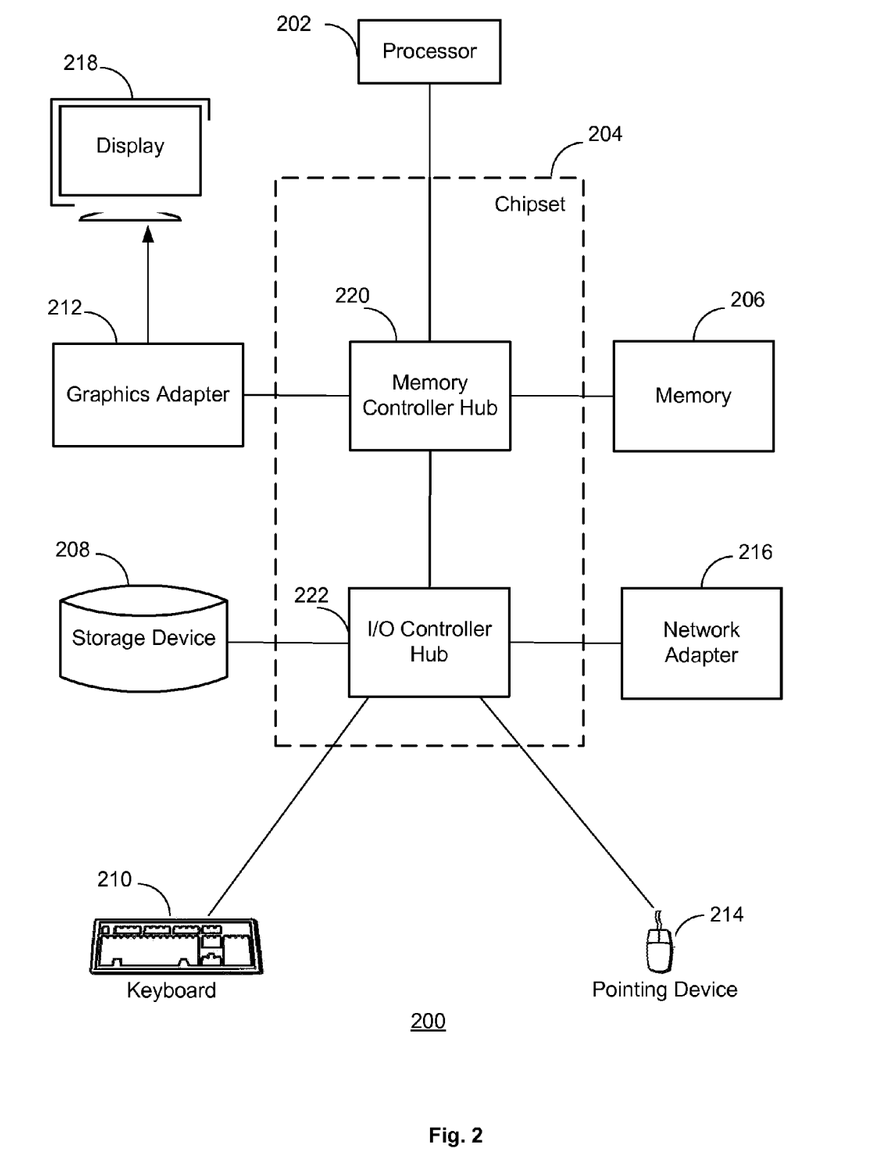
FIG. 2 is a high-level block diagram illustrating an example computer.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the image management system 103 might comprise multiple blade servers working together to provide the functionality described herein. As another example, the client 105 might comprise a smartphone with limited processing power. The computers 200 can lack some of the components described above, such as keyboards 210, graphics adapters 212, and displays 218. In addition, the image management system 103 can run in a single computer 200 or multiple computers 200 communicating with each other through a network such as in a server farm.

Image Management System

Figure 3:
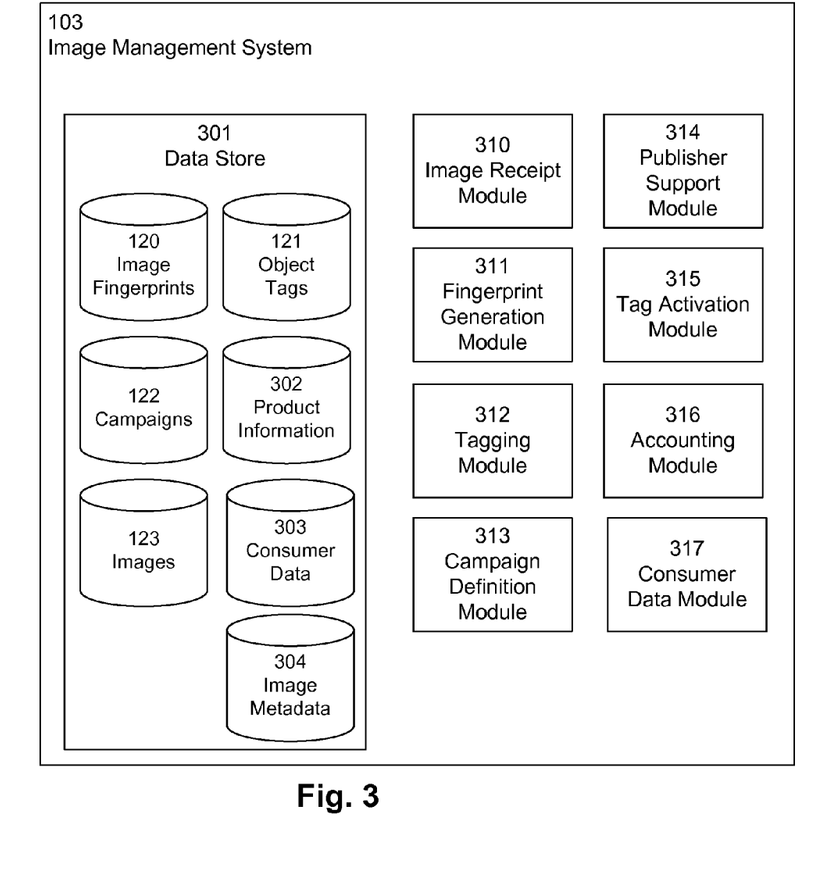
FIG. 3 is a high-level block diagram illustrating a detailed view of modules within the image management system according to one embodiment.

FIG. 3 is a high-level block diagram illustrating a detailed view of modules within the image management system 103 according to one embodiment. Some embodiments of the image management system 103 have different and/or other modules than the ones described herein. Similarly, the functions can be distributed among the modules in a different manner than is described here. In addition, each module in FIG. 3 may be implemented by a set of computers operating in parallel to further improve efficiency. As illustrated, the image management system 103 includes a data store 301, image receipt module 310, fingerprint generation module 311, tagging module 312, campaign definition module 313, publisher support module 314, tag activation module 315, accounting module 316, and consumer data module 317.

The data store 301 stores data used by the image management system 103. Examples of such data include the image fingerprints 120, object tags 121, campaigns 122, images 123, product information 302, consumer data 303, and image metadata 304. The data store 301 may be a relational database or any other type of database, or an in-memory data structure.

The image receipt module 310 receives images 123 from photo agency systems 101. In one embodiment the image receipt module 310 uses the web server to provide a web-based UI enabling a photo agency to submit images using a web browser. Other embodiments accept images 123 via different techniques, such as via physical media, via email, and via other forms of electronic communication. The image receipt module 310 stores the submitted images 123 and metadata in the data store 301.

The image receipt module 310 also receives and stores metadata 304 provided by the photo agency system 101. The metadata 304 may be encoded within the images or supplied in a format external to the images. As mentioned above, metadata 304 describes the content of an image such as where and when the image was captured and an identification of people shown the image. The metadata 304 may also identify the photo agency that supplied the image, the type of camera used to capture the image, and keywords or similar data that describe the image. For example, the metadata 304 may indicate that an image shows a famous celebrity presenting an award at a specific awards show. Oftentimes, a photo agency will submit multiple similar images showing the same scene. For example, the photo agency may submit multiple images of the celebrity presenting the award all captured within a brief time interval.

The fingerprint generation module 311 generates image fingerprints for the images 123 received from the photo agency systems 101. An image fingerprint 120 is a unique digital signature that serves to identify an image 123 in the image management system 103. The image fingerprints 120 are used by the image management system 103 to index images 123 stored in the data store 301. In one embodiment, the fingerprint generation module 311 generates image fingerprints 120 that are invariant to select affine transformations, notably resizing and mirror flipping. Also, such image fingerprints 120 are largely insensitive to minor changes, such as noise introduced by lossy image compression. Thus, the image fingerprint 120 allows an image to be identified even if the image 123 has been changed in certain ways since its fingerprint was generated.

In one embodiment, the fingerprint generation module 311 generates an image fingerprint 120 by transforming the image from a color space representation to a computationally more efficient representation, such as equalized grayscale, to reduce computational effort in subsequent steps. Next, the fingerprint generation module 311 filters the image to de-emphasize minor features that may lose their sharpness in scaled copies of the image, for example, by applying a Gaussian blur. Then the fingerprint generation module 311 transforms the image into a feature space representation whereby the resulting feature matrix can be used as-is or can be further transformed to a standard size to simplify the process. For example, the transformation to feature space can be accomplished using the Marr-Hildreth operator, and for computational efficiency scaling can be performed prior to the Marr-Hildreth filter to obtain a 32-by-32 (fixed-size) feature matrix (this feature matrix is the image fingerprint 120 in this embodiment). This process results in similar fingerprints for similar images. Thus, comparison of such image fingerprints 120 can be computed using fuzzy logic, which enables the detection of similar images using a threshold or other technique for comparing fingerprints. For example, the fuzzy logic may find image matches even with minor variations in the feature matrix adhering to patterns exhibited by resized copies of the same image.

The tagging module 312 allows marketers to tag objects shown in the images 123 stored in the data store 301. In one embodiment, the tagging module 312 uses the web server to provide a web-based UI enabling the marketers to browse and search the images using the metadata (e.g., browse by celebrity, browse by event). The UI also allows the marketers to specify the identity of an object shown in a particular image, and to specify the location of the object within the image. The marketer may specify the location, by, for example, creating a bounding box identifying the part of the image in which the object resides.

In one embodiment, the tagging module 312 receives product information 302 from the marketers and stores this information in the data store 301. The product information includes details about products that the marketer 102 is interested in marketing through the image management system 103. The types of product information can vary, and may include information such as additional images of the product, a textual description of the product, a stock-keeping unit (SKU) or other unique identifier of the product, links to web pages that provide additional information about the product or allow the purchase of the product, pricing information, inventory information, etc.

The marketer can tag a product by associating the object shown in the image to the corresponding product described by the product information 302. The tagging module 312 stores the association between the object and the product information 302 in the data store 301 as an object tag 121. The tagging module 312 also stores position information indicating the specified location of the object in the image.

One embodiment of the tagging module 312 supports an auto-tagging process that automatically tags products in images based on a seed tag made by a marketer. In the auto-tagging process, the tagging module 312 uses the image metadata 304 to identify images related to each other, which may contain the same product. For example, the tagging module 312 may use metadata to identify images showing the same person at the same event. A marketer then tags the product in one image, called the seed image, in this group of related images. Next, the tagging module 312 propagates the seed tag—that is the object location information in the seed image—from the seed image to the group of related images. To propagate the seed tag to the related images, the tagging module 312 identifies visual features of the objects underneath or near the tagged locations in the seed image, and then tags the matching visual features—the matching objects—in the related images. The tagging module 312 uses this new tag information to create new object tags associated with the related images and stores them in the data store 301.

In one embodiment, the tagging module 312 refines the selection of related images, discovered through metadata, by regrouping images using fuzzy rules based on their dominant visual characteristics. For example, the tagging module 312 may compute multidimensional color histograms of the related images and regroup them based on the similarities of the dominant histogram characteristics, using a fuzzy rule-based system. Once the images are grouped in this way, the auto-tagging process, as described above, is used to propagate the tags from a single seed image to the rest of the images in the group.

The tagging module 312 also allows the marketer to specify actions to perform when a consumer interacts with a tagged object. The actions may include displaying specified icons, displaying text or images, and displaying buttons or other UI elements with which the consumer can interact. For example, the marketer may use the tagging module 312 to define buttons that a consumer can use to access another web page in order to purchase an object displayed in the image.

The campaign definition module 313 enables a marketer to define campaigns, and stores the campaigns 122 in the data store 301. In one embodiment, the campaign definition module 313 uses the web server to provide a web-based UI enabling the marketers to define the campaign. As mentioned above, a campaign specifies one or more objects and payment conditions indicating the amount of money that the marketer is willing to pay for consumer engagement with those objects.

To define a campaign, the marketer supplies parameters describing the campaign. The parameters include the time period over which the campaign will run, the total spend (i.e., amount the marketer will pay for the campaign), and the types of consumer engagement with a tagged image that trigger a payment from the spend. In addition, the parameters include the objects involved in the campaign. In one embodiment, the campaign definition module 313 provides the marketer with an interface allowing the marketer to select from among the marketer's products in the product information 302 in the data store 301. For example, the campaign definition module 313 may allow the marketer to view a list of products that the marketer added to the product information 302, and select products in the list to include in the campaign.

In one embodiment, the campaign definition module 313 allows the marketer to select from a variety of different consumer engagements that will trigger a spend for the campaign. These engagements include display of the image showing a product in the campaign, a user expressing interest in a displayed product by moving a mouse cursor over the tagged product or otherwise performing a similar action, a user clicking on a link included in an object tag, and a consumer purchasing a product through the object tag. The marketer can specify the amount to spend per interaction using techniques including cost per thousand (CPM) (the amount to pay per thousand engagements), cost per click (CPC) (the amount to pay per click of a link), and cost per action (the amount to pay per the consumer performing a specified action).

The publisher support module 314 enables publishers to select and obtain images 123 from the photo agencies for use in association with the publishers' own content. In one embodiment, the campaign definition module 313 uses the web server to provide a web-based UI enabling the publishers to access the images 123. The publisher support module 314 provides a search function that allows publishers to search the images using a variety of search criteria, such as by keyword, date, and photo agency. The search function compares the search criteria with the image metadata 304 to return a set of images that satisfy the search. For example, a publisher can search for images of a particular celebrity and the search function of the publisher support module 314 supplies a set of images showing the celebrity. The publisher support module 314 allows a publisher to obtain (e.g., download) selected images.

At least some or all of the images 123 that the publisher support module 314 returns to the publishers have associated campaigns. In other words, the images include objects that are the subject of active campaigns by marketers. Accordingly, an embodiment of the publisher support module 314 displays real-time campaign information in association with the images. For a given image, the campaign information may indicate the spend that a marketer will pay for a consumer engagement with the object shown in the image, the types of engagement that trigger payment, and the amount of budget left in the campaign. The publisher support module 314 updates the displayed campaign information in real-time, as the campaigns proceed. The publisher may use the campaign information to aid in selecting an image.

The tag activation module 315 generates tag modules 124 and provides the tag modules to publishers for inclusion in published web pages. In one embodiment, a publisher serves a tag module 124 in a web page having one or more images from the image management system 103. The tag module 124 includes code that is executed by the browser at the client 105 and provides functionality allowing a consumer using the client to interact with any tags in images in the web page. In one embodiment the tag module 124 includes JAVASCRIPT code, but other embodiments may include other forms of code.

When the tag module 124 executes at a client 105, the tag module identifies images in the same web page as the tag module 124. The tag module 124 fingerprints these images using the same fingerprint technique used by the fingerprint generation module 311. The tag module 124 then accesses the image fingerprints 120 in the data store 301 of the image management system 103 to determine which, if any, of the published images in the web page match images in the image management system. If one or more images match, the tag module 124 obtains the object tags 121 for the matching images.

The tag module 124 executes at the client 105 to display the object tags to the consumer. In one embodiment, the tag module 124 displays object tags only when a consumer displays an interest in a tagged image. For example, the tagged image may appear "normal" (i.e., without any tags) when the consumer is not interacting with the image. If the consumer interacts with the image by, e.g., hovering a mouse cursor over the image, the tag module 124 displays the tags on the image. The tags may appear as icons overlaid on the image at the locations of the tagged objects. In one embodiment, different icons represent different types of information contained in the tag. For example, a "person" icon may indicate that a tag contains information about a tagged person, while a "price tag" icon may indicate that a tag contains information about purchasing a tagged product.

In one embodiment, if the consumer displays an interest in a particular tag by, e.g., hovering a mouse cursor over the tag's icon, the tag module 124 displays information about the tagged object. The information may include graphical and textual descriptions of the tagged object and may appear in a pop-up window or in other UI elements. In addition, the displayed information may include UI elements such as clickable buttons and text entry fields with which the consumer can interact. For example, the information displayed by the tag module 124 may include a "shop" button that the consumer can select to access a shopping web page on which the consumer can purchase the object. Other buttons may provide different functionalities.

Further, an embodiment of the tag module 124 reports consumers' interactions with tags to the image management system 103. The reported interactions can vary in different embodiments, and may include reporting when a tagged image is displayed at a client 105, when the user displays an interest in a tagged image and causes the tag module 124 to display the tags and when the user interacts with individual tags. The reported interactions with the tags may include a description of the information displayed at the client 105, the buttons selected by the consumer, any information provided by the consumer during the interactions and purchases of objects via the tags.

The accounting module 316 at the image management system 103 receives and stores the interactions reported by the tag modules 124 executing at the clients 105. In addition, the accounting module 316 may store interactions by the photo agencies, marketers, and publishers with the image management system 103, as well as consumer interactions with other entities on the network 106 that are reported to the image management system. In one embodiment, the accounting module 316 tracks and analyzes the interactions in order to account for, and facilitate the receipt and disbursement of, funds by the image management system 103.

The accounting performed by the accounting module 316 may vary in different embodiments and may depend on contracts between the photo agencies, marketers, and publishers and the image management system 103. In one embodiment, a photo agency that supplies an image is paid a specified amount each time that image is selected (e.g., downloaded) by a publisher 104. Moreover, the marketers are charged specific amounts according to the campaigns established by the marketers. Thus, a marketer may be charged a specific fee each time a consumer interacts with an object tag placed by the marketer for an object included in a campaign. The accounting module 316 may, in turn, distribute the fee paid by the marketer among the image management system 103, the publisher and the photo agency. In one embodiment, the accounting module 316 maintains accounts on behalf of the photo agencies, marketers, and publishers, and deducts and credits funds in the accounts according to the various interactions.

The consumer data module 317 in the image management system 103 receives and stores data that the consumers provide while interacting with object tags on the clients 105. The data may include demographic, geographic, and other forms of data describing the consumers. For example, while interacting with a tag for a pair of shoes, a consumer may provide his or her shoe size and a mailing address. The tag module 124 sends this information to the image management system 103, and the consumer data module 317 saves the information in association with the consumer. In one embodiment, the consumer data module 317 makes the consumer data available to marketers to aid the marketers in targeting campaigns. The consumer data may be anonymous or otherwise modified to remove personally-identifiable information.

Operation

Figure 4:
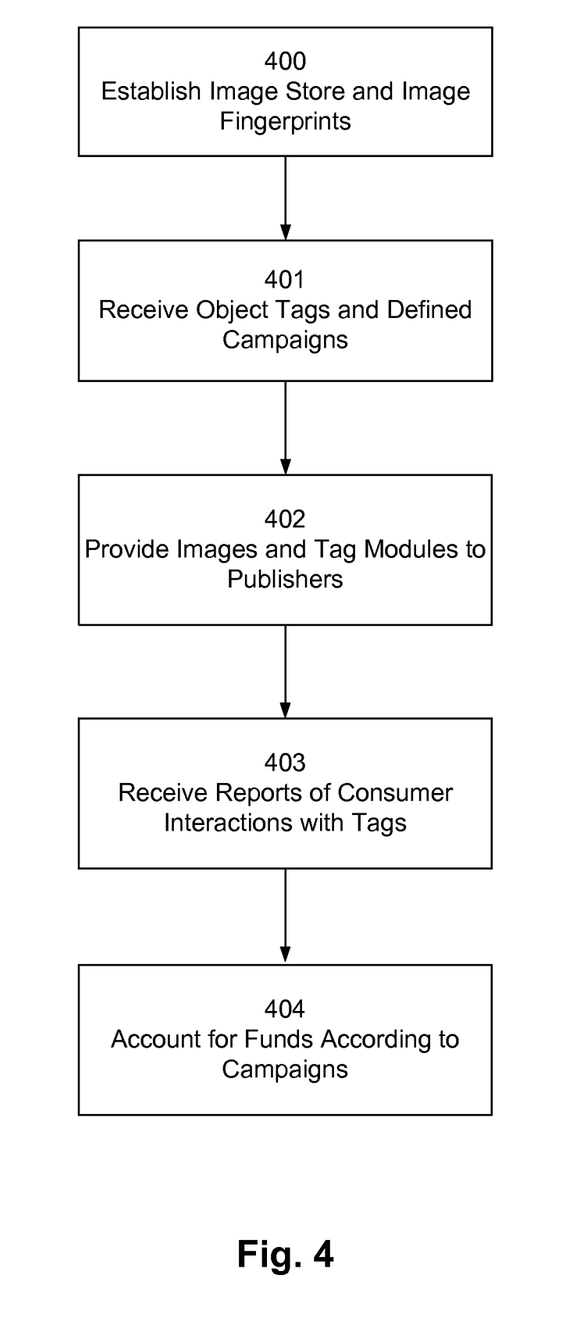
FIG. 4 is a flow chart illustrating the operation of the image management system according to one embodiment.

FIG. 4 is a flow chart illustrating the operation of the image management system 103 according to one embodiment. Some embodiments perform the steps in different orders, and performed different or additional steps than those illustrated in FIG. 4. Moreover, some or all of the steps can be performed by different entities in different embodiments.

The image management system 103 establishes 400 an image store. In one embodiment, the images in the store are supplied by photo agencies. The image management system 103 computes 400 image fingerprints for these images. The fingerprints uniquely identify the images.

The image management system 103 interacts with a marketer to receive 401 object tags for objects in the images. To this end, the marketer may browse and search the images and identify products or other objects shown in the images. The marketer also specifies the location of the objects in the image. In one embodiment, the image management system 103 automatically tags other images showing the same object. The image management system 103 further receives 401 information describing a campaign defined by the marketer. The campaign has parameters that specify one or more objects involved in the campaign and payment conditions indicating an amount of money that the marketer is willing to pay for consumer engagement with those objects.

The image management system 103 provides 402 the images to one or more publishers. In one embodiment, the publishers search among the images at the image management system 103 and select desired images. A publisher downloads or otherwise obtains the images from the image management system 103, and may then publish the images on the publisher's own website. The image management system 103 also provides 402 the publisher with a tag module 124 to distribute with the images. The tag module 124 executes on clients 105 of consumers to provide functionality allowing the consumers to interact with tags in the images published by the publisher. In one embodiment the tag module 124 fingerprints the images published by the publisher and communicates with the image management system 103 to obtain object tags for the images. The tag module 124 then displays the object tags at the clients 105.

The image management system 103 receives 403 reports from the executing tag modules 124 describing the consumers' interactions with the tags. The image management system 103 tracks and analyzes the interactions, and accounts 404 for receipt and disbursement of funds based on the interactions. In one embodiment, the image management system 103 collects fees based on the interactions from marketers according to the parameters of the marketers' campaigns and distributes portions of the fees to the publishers, photo agencies and the image management system.

Implementation

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying known establishments in images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for interactive delivery of information through images, comprising:
    establishing, by a computer, an image store including a plurality of images, an image in the image store showing an object;
    receiving, by the computer, an object tag for the image, the object tag identifying and providing information about the object shown in the image, wherein the image showing the object is received from a photo agency and wherein receiving an object tag for the image comprises:

receiving product information from a marketer independent of the photo agency, the product information describing information about a product marketed by the marketer;
interacting with the marketer to receive an association between the object shown in the image and the product marketed by the marketer; and
storing the association between the object and the product as the object tag;
providing, by the computer, the image to a remote publisher, the publisher adapted to publish the image to a client;
providing, by the computer, a tag module to the publisher, wherein:
the publisher is adapted to provide the tag module to the client;
the tag module is adapted to execute at the client to receive the information about the object shown in the image;
the tag module is adapted to display the information about the object shown in the image;
the tag module is adapted to display an interface on the client allowing a consumer using the client to interact with the displayed information; and
the tag module is adapted to report consumer interactions with the displayed information to an image management server independent of the publisher; and
providing the information about the object shown in the image to the client responsive to the client receiving the published image from the publisher.

2. The method of claim 1, wherein establishing the image store comprises:
receiving a plurality of images from one or more remote photo agencies;
receiving metadata describing content of the plurality of images from the one or more remote photo agencies;
using the image metadata to identify a set of related images; and
propagating the object tag to images in the set of related images.

3. The method of claim 1, further comprising:
interacting with the marketer to define a marketing campaign for the object shown in the image, the marketing campaign having payment conditions indicating a type of engagement with the image that triggers a payment by the marketer;
receiving a report from the client describing an engagement with the image by a consumer using the client;
determining if the payment conditions of the campaign are satisfied by the engagement with the image by the consumer; and
accounting for the payment by the marketer responsive to a determination that the payment conditions are satisfied.

4. The method of claim 1, further comprising:
interacting with the marketer to define a marketing campaign for the object shown in the image, the marketing campaign having payment conditions indicating payment the marketer will pay for consumer engagement with the image; and
displaying to the publisher real-time information describing the payment conditions for the campaign in association with the tagged image.

5. The method of claim 1, further comprising:
generating image fingerprints uniquely identifying images in the image store;

determining whether a fingerprint of the published image received by the client matches a fingerprint of the image in the image store showing the object; and
providing the information about the object shown in the image to the client responsive to a determination that the fingerprints match.

6. The method of claim 1, wherein the object tag indicates a location of the object within the image and wherein the tag module is further adapted to display a visual marker of the tag at the location of the object within the image.

7. A non-transitory computer-readable storage medium storing executable computer program instructions for interactive delivery of information through images, the instructions executable to perform steps comprising:
establishing an image store including a plurality of images, an image in the image store showing an object;
receiving an object tag for the image, the object tag identifying and providing information about the object shown in the image, wherein the image showing the object is received from a photo agency and wherein receiving an object tag for the image comprises:
receiving product information from a marketer independent of the photo agency, the product information describing information about a product marketed by the marketer;
interacting with the marketer to receive an association between the object shown in the image and the product marketed by the marketer; and
storing the association between the object and the product as the object tag;
providing the image to a remote publisher, the publisher adapted to publish the image to a client;
providing a tag module to the publisher, wherein:
the publisher is adapted to provide the tag module to the client;
the tag module is adapted to execute at the client to receive the information about the object shown in the image;
the tag module is adapted to display the information about the object shown in the image;
the tag module is adapted to display an interface on the client allowing a consumer using the client to interact with the displayed information; and
the tag module is adapted to report consumer interactions with the displayed information to an image management server independent of the publisher; and
providing the information about the object shown in the image to the client responsive to the client receiving the published image from the publisher.

8. The computer-readable medium of claim 7, wherein establishing the image store comprises:
receiving a plurality of images from one or more remote photo agencies;
receiving metadata describing content of the plurality of images from the one or more remote photo agencies;
using the image metadata to identify a set of related images; and
propagating the object tag to images in the set of related images.

9. The computer-readable medium of claim 7, the steps further comprising:
interacting with the marketer to define a marketing campaign for the object shown in the image, the marketing campaign having payment conditions indicating a type of engagement with the image that triggers a payment by the marketer;

receiving a report from the client describing an engagement with the image by a consumer using the client;

determining if the payment conditions of the campaign are satisfied by the engagement with the image by the consumer; and accounting for the payment by the marketer responsive to a determination that the payment conditions are satisfied.

10. The computer-readable medium of claim 7, the steps further comprising:

interacting with the marketer to define a marketing campaign for the object shown in the image, the marketing campaign having payment conditions indicating payment the marketer will pay for consumer engagement with the image; and displaying to the publisher real-time information describing the payment conditions for the campaign in association with the tagged image.

11. The computer-readable medium of claim 7, the steps further comprising:

generating image fingerprints uniquely identifying images in the image store;

determining whether a fingerprint of the published image received by the client matches a fingerprint of the image in the image store showing the object; and providing the information about the object shown in the image to the client responsive to a determination that the fingerprints match.

12. The computer-readable medium of claim 7, wherein the object tag indicates a location of the object within the image and wherein the tag module is further adapted to display a visual marker of the tag at the location of the object within the image.

13. A computer for interactive delivery of information through images, the computer comprising:

a non-transitory computer-readable storage medium storing executable computer program instructions for interactive delivery of information through images, the instructions executable to perform steps comprising:

establishing an image store including a plurality of images, an image in the image store showing an object;

receiving an object tag for the image, the object tag identifying and providing information about the object shown in the image, wherein the image showing the object is received from a photo agency and wherein receiving an object tag for the image comprises:

receiving product information from a marketer independent of the photo agency, the product information describing information about a product marketed by the marketer;

interacting with the marketer to receive an association between the object shown in the image and the product marketed by the marketer; and storing the association between the object and the product as the object tag;

providing the image to a remote publisher, the publisher adapted to publish the image to a client;

providing, by the computer, a tag module to the publisher, wherein:

the publisher is adapted to provide the tag module to the client;

the tag module is adapted to execute at the client to receive the information about the object shown in the image;

the tag module is adapted to display the information about the object shown in the image;

the tag module is adapted to display an interface on the client allowing a consumer using the client to interact with the displayed information; and the tag module is adapted to report consumer interactions with the displayed information to an image management server independent of the publisher; and providing the information about the object shown in the image to the client responsive to the client receiving the published image from the publisher; and a processor for executing the computer program instructions.

14. The computer of claim 13, wherein establishing the image store comprises:

receiving a plurality of images from one or more remote photo agencies;

receiving metadata describing content of the plurality of images from the one or more remote photo agencies;

using the image metadata to identify a set of related images; and propagating the object tag to images in the set of related images.

15. The computer of claim 13, wherein the instructions are further executable to perform steps comprising:

interacting with the marketer to define a marketing campaign for the object shown in the image, the marketing campaign having payment conditions indicating a type of engagement with the image that triggers a payment by the marketer;

receiving a report from the client describing an engagement with the image by a consumer using the client;

determining if the payment conditions of the campaign are satisfied by the engagement with the image by the consumer; and accounting for the payment by the marketer responsive to a determination that the payment conditions are satisfied.

16. The computer of claim 13, wherein the instructions are further executable to perform steps comprising:

interacting with the marketer to define a marketing campaign for the object shown in the image, the marketing campaign having payment conditions indicating payment the marketer will pay for consumer engagement with the image; and displaying to the publisher real-time information describing the payment conditions for the campaign in association with the tagged image.

17. The computer of claim 13, wherein the instructions are further executable to perform steps comprising:

generating image fingerprints uniquely identifying images in the image store;

determining whether a fingerprint of the published image received by the client matches a fingerprint of the image in the image store showing the object; and providing the information about the object shown in the image to the client responsive to a determination that the fingerprints match.

18. The computer of claim 13, wherein the object tag indicates a location of the object within the image and wherein the tag module is further adapted to display a visual marker of the tag at the location of the object within the image.

* * * * *